Feb. 4, 1936.                    R. BERNHEIM                    2,029,979
                                PHONOGRAPHIC FILM
                                Filed Oct. 2, 1934

INVENTOR:
Roger Bernheim
BY
ATTORNEY

Patented Feb. 4, 1936

2,029,979

UNITED STATES PATENT OFFICE 2,029,979

PHONOGRAPHIC FILM

Roger Bernheim, Bezons, France, assignor to Le Film Ozaphane, Société Anonyme, a corporation of France Application October 2, 1934, Serial No. 746,492
In France October 14, 1933

8 Claims. (Cl. 274—41.6)

Thin films of regenerated cellulose are particularly well adapted for obtaining phono-photographic bands. The most simple method of making them consists in sensitizing the film of regenerated cellulose with a mixture of a light-sensitive diazo compound and a phenol. The film is then exposed behind a photographic record carrying the sound record to be reproduced and developed in an ammoniacal atmosphere.

An object of the present invention is to provide a process which allows a large number of copies of the same sound record or phonogram to be reproduced.

Another object of the present invention is to provide a process of producing a number of copies of a sound track by photographically enlarging a sound track to form a film containing a wide sound track extending across the film and then cutting the film longitudinally into a plurality of films of smaller width having identical sound tracks.

A further object of this invention is to provide as novel products the films obtained by longitudinally cutting a film having a wide sound track into a plurality of films of smaller width having identical sound tracks.

Figure 1:
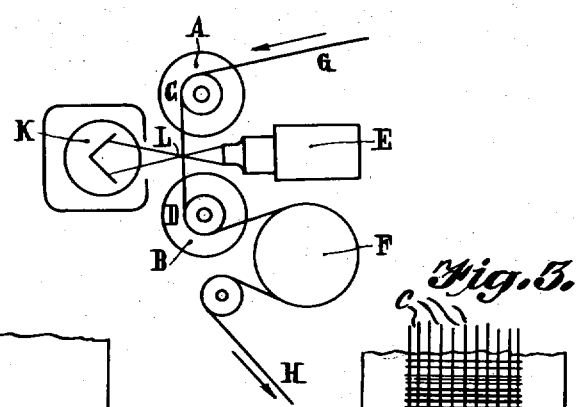
Figure 1 is a schematic view of a reproducing apparatus.
Figure 2:
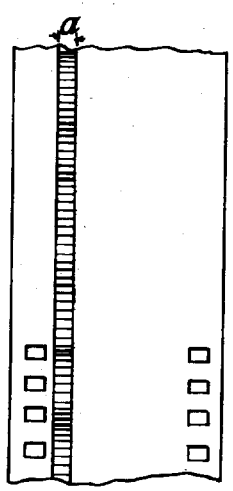
Fig. 2 is a diagrammatic plan view of a film carrying an ordinary sound track.
Figure 3:
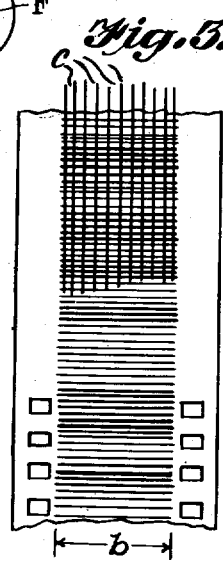
Fig. 3 is a similar view of a film carrying the same sound record enlarged.

The process in question is preferably carried out in the following manner:

First, the photographic record of the phonogram is prepared by recording it over the whole useful width of a sensitive celluloid film such as shown in Fig. 3 by the variable density process. On a perforated 35 mm. standard celluloid film, it is thus possible to record a single sound track of 24 mm. in width. This recording is effected either by electrical means, for example by the aid of a light source illuminating a slot projected on the films and having 24 mm. width, or photographically, starting from a normal sound record (Fig. 1) having a width $a$ of a few millimetres, of which an enlargement is reproduced by projection by means of an objective for enlarging horizontally without enlarging vertically.

Secondly, after having reproduced the photographic record on a regenerated cellulose film sensitized by a diazo derivative or by any other means (with silver salts, for example, in the mass of the film, or in the form of a layer of silver bromide gelatine emulsion), the copy thus obtained is passed through a longitudinal cutting machine permitting narrow bands to be obtained of which each one is a complete phonogram obtained under very economical conditions. For example, recorded width $b$ of 24 mm. is cut along lines $c$ into 12 bands each 2 mm. wide or 24 bands each 1 mm. wide, which are wound on small spools in the manner usual with textiles.

For reproducing the sound devices are used which suppress all friction injurious to the sound film, in order to avoid scratching the film, and giving rise to parasitic noises. To this end, as shown diagrammatically by way of example in Fig. 1 of the annexed drawing, the gate usually employed will be replaced by two rollers A and B provided with flanges intended to prevent lateral movement of the film. The thin and narrow sound film or "phonofilm" occupies an invariable rectilinear position C D on the tangential line common to the two rollers, and it is in this part C D, for example at L, that there will be projected by the aid of a known optical device E, the luminous slot which serves for the reproduction, this slot having as desired a length less than, equal to, or more than that of the phonofilm.

There is shown at K a photo-electric cell receiving the light which has passed through the sound record.

The regular movement of the film is ensured for example by a drum F actuated at a suitable uniform speed and provided with a circumferential surface of rubber. The film unwinds from G with a slight tension and it is rewound towards H where it is acted upon by a friction winder which maintains a suitable tension on the film without causing breakage.

It is to be understood that the phono-photographic record can be made with several records side by side of large width, each record being able to provide, by being cut, two or more strips of small width similar to those previously described.

Instead of a single variable density record of large width, there might also be reproduced on the celluloid film serving as a matrix, a very large number of very narrow and adjacent identical records of variable or fixed density. Each elementary phonofilm when cut up would then carry a certain number of these elementary recordings.

I claim:—

1. The method of obtaining a plurality of sound films from a film bearing a wide photographic sound record extending across the film, which comprises cutting the film longitudinally into a plurality of strips having identical sound records.

2. The method of multiplying sound films bearing wide photographic sound records of the variable density type extending across the film, which comprises cutting the recorded width of the film longitudinally into a plurality of separate strips having identical sound records.

3. The method of forming a plurality of copies of phono-photographic film strips, which comprises forming a wide photographic sound record over the whole useful width of a light-sensitive film by the variable density process, reproducing this record on a light-sensitive film, and cutting the copy thus obtained into a plurality of separate strips having identical sound records and each constituting a complete phonogram.

4. The method of forming a plurality of copies of phono-photographic film strips, which comprises forming a photographic sound record on a light-sensitive film by the variable density process, projecting by means of a suitable objective an enlarged image of this sound record on a comparatively wide light-sensitive film to produce a wide sound record extending across the film, and longitudinally cutting the enlarged copy thus produced to form a plurality of strips having identical sound records and each constituting a complete phonogram.

5. A phonofilm of small width consisting of a band of thin film of the type of regenerated cellulose, obtained by the longitudinal cutting up of a more or less wide band, on which there has been reproduced photographically a variable density sound record the width of which is equal to several times the width of the unit phonofilms obtained after cutting up, to produce a plurality of films having identical sound records.

6. A phonofilm of small width consisting of a band of thin film of the type of regenerated cellulose, obtained by the longitudinal cutting up of a more or less wide band, on which there has been reproduced by a photomechanical process a variable density sound record the width of which is equal to several times the width of the unit phonofilms obtained after cutting up, to produce a plurality of films having identical sound records.

7. A method of producing a plurality of film sound tracks of the variable density type, comprising producing a photographic enlargement of a film sound track on a film in a direction transversely of the film while maintaining the longitudinal dimension of the enlarged image equal to the original, and cutting the film containing the enlarged image longitudinally into a plurality of strips.

8. A method of producing a plurality of sound films, comprising projecting on a light sensitive film equal in width to the total width of the number of films to be produced a photographic image of a sound track, which image is equal in longitudinal dimension to the sound track and enlarged transversely relative to the sound track to extend across the full width of the light sensitive film, and cutting the film containing the enlarged image into a plurality of longitudinal strips.

ROGER BERNHEIM.